United States Patent [19]

Preiss

[11] Patent Number: 4,901,826
[45] Date of Patent: Feb. 20, 1990

[54] VEHICLE EQUIPPED WITH AIR-COOLED WHEEL BRAKES

[75] Inventor: Michael Preiss, Vaihingen-Enz/Aurich, Fed. Rep. of Germany

[73] Assignee: Dr. Ing. h.c.F. Porsche AG, Weissach, Fed. Rep. of Germany

[21] Appl. No.: 307,956

[22] Filed: Feb. 9, 1989

[30] Foreign Application Priority Data

Feb. 9, 1988 [DE] Fed. Rep. of Germany ....... 3803801

[51] Int. Cl.⁴ ........................................... F16D 65/847
[52] U.S. Cl. ............................... 188/264 A; 188/71.6; 188/264 R; 192/113 A; 301/6 CS
[58] Field of Search ....... 188/264 R, 264 A, 264 AA, 188/71.6; 192/113 A; 301/6 CS

[56] References Cited

U.S. PATENT DOCUMENTS

| 2,726,742 | 12/1955 | Dunz | 188/264 R |
| 4,473,139 | 9/1984 | Oka et al. | 188/71.6 |
| 4,503,944 | 3/1985 | Burckhardt | 188/264 AA X |
| 4,772,299 | 9/1988 | Bogusz | 188/71.6 X |
| 4,805,747 | 2/1989 | Moedinger et al. | 188/264 AA X |

FOREIGN PATENT DOCUMENTS

| 8114958 | 12/1983 | Fed. Rep. of Germany . |
| 3525627 | 6/1986 | Fed. Rep. of Germany . |
| 641133 | 8/1950 | United Kingdom ............ 188/264 R |
| 677248 | 8/1952 | United Kingdom ........ 188/264 AA |

*Primary Examiner*—George E. A. Halvosa
*Attorney, Agent, or Firm*—Barnes & Thornburg

[57] ABSTRACT

An air guiding arrangement for wheel brakes of a motor vehicle comprises a profiled deflecting element which is adjusted against the arriving air current. The arrangement is constructed with an air deflecting element held at the vehicle and extending in transverse direction of the vehicle which is arranged below an adjacent dome-shaped air catching and guiding element. It faces the deflecting element with its air inlet area and is located opposite an opening in the brake protection plate with its air outlet area.

10 Claims, 1 Drawing Sheet

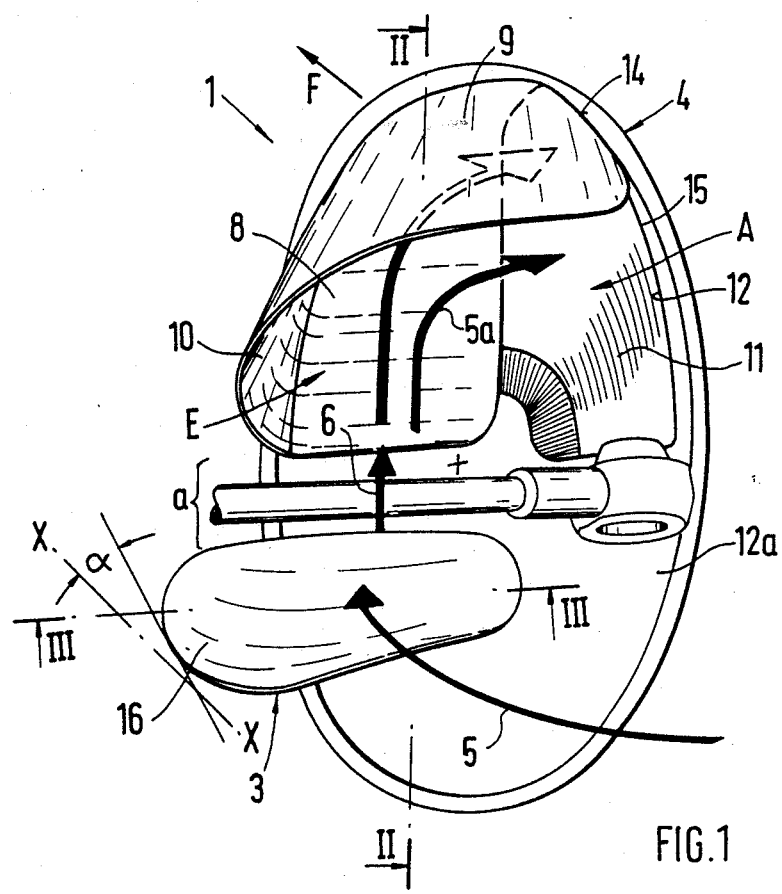
FIG.1
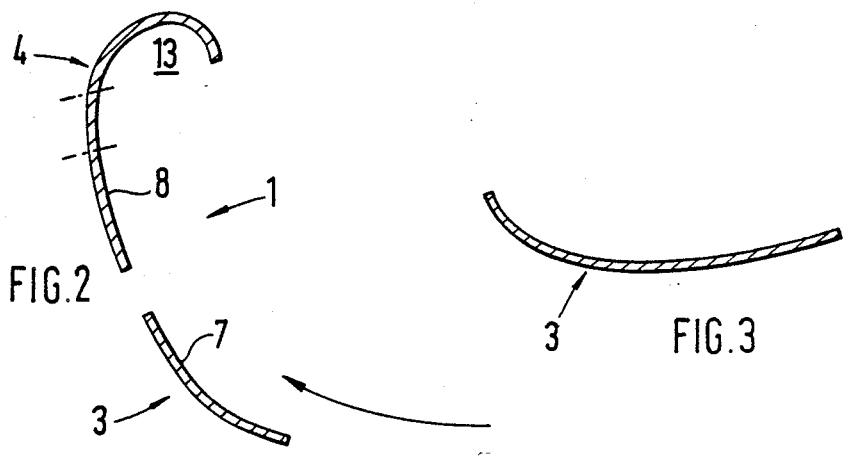
FIG.2
FIG.3

VEHICLE EQUIPPED WITH AIR-COOLED WHEEL BRAKES

BACKGROUND AND SUMMARY OF THE DISCLOSURE

The invention relates to an air guiding arrangement for wheel brakes of motor vehicles which has a profiled deflecting element for deflecting the incoming air current.

From German Published Unexamined Patent Application (DE-OS) 35 25 627, an air guiding arrangement for wheel brakes is known which, at the underside of the vehicle, comprises a channel-type air inlet formed of an air guiding profile, a front spoiler, and a deflecting element. This element is assigned directly to the wheel, is provided close to the wheel, and has the purpose of guiding the arriving air current or air stream to the brake and thus causing a cooling. In this type of construction, an essential part of the fed air is blown into the wheel housing and is not channelled to the brake, so that a sufficient cooling of the brake disk is not ensured. In addition, the air which is blown into the wheel housing causes a disadvantageous front-axle lift.

It is an object of the invention to provide an air guiding arrangement of the type mentioned above, which guides the arriving air current from the air stream directly to the brake disk without any significant losses, and a sufficient cooling of the brake disk is ensured.

According to the invention, this object is achieved by providing an arrangement wherein the arrangement comprises a vehicle-held air deflecting element, which extends in transverse direction of the vehicle and is arranged below an adjacent air catching and guiding element which, with its air inlet area (E), faces the deflecting element and, by means of its air outlet area (A), is located opposite an opening in the brake protection plate.

The main advantages achieved by the invention are that, by means of an air deflecting element, which is fastened, for example, at the wheel suspension link and which is adjusted with respect to an air catching and guiding element arranged above it, a forced guiding of the arriving air current to the brake is achieved. The air, by means of the air catching and guiding element connecting directly to the brake protection plate, can be guided without any significant losses to an opening in the brake protection plate and thus directly to the brake disk, and flow axially onto this brake disk.

For the targeted guiding of the air, the air catching and guiding element is constructed in a dome-shaped manner such that the air fed via the deflecting element, which is located at a lower point, cannot escape toward the side and upwards, but by means of the curved side walls is blown into the opening in an optimized manner. In addition, it is achieved that the front axle lift is reduced by the deflecting of the air.

Other objects, advantages and novel features of the present invention will become apparent from the following detailed description of the invention when considered in conjunction with the accompanying drawings.

BRIEF DESCRIPTION OF THE DRAWINGS

FIG. 1 is a diagrammatic representation of an air guiding arrangement in the area of the brake at the vehicle wheel, constructed in accordance with a preferred embodiment of the invention;

FIG. 2 is a partial longitudinal sectional view of the air guiding arrangement of FIG. 1, taken along Line II—II of FIG. 1; and FIG. 3 is a partial sectional view taken along Line III—III of FIG. 1 of a deflecting element of the air guiding arrangement.

DETAILED DESCRIPTION OF THE DRAWINGS

An air guiding arrangement 1 for a wheel brake 2 comprises essentially an air deflecting element 3 and an air catching and guiding element 4. The deflecting element 3 is arranged at the level of a wheel suspension link and is connected with it. Above it, the air catching and guiding element 4 is provided, which is fixed at the spring strut close to the brake disk 11. It faces the deflecting element 3 with its air inlet area E, and an opening 12 in the brake protection plate 12a with its air outlet area A.

The deflecting element 3 extends in transverse direction of the vehicle and, with respect to the arriving air current 5, is adjusted by an angle $\alpha$ with respect to a horizontal plane X—X in such a manner that this air current 5 is deflected upward in the direction of the arrow 6. The air catching and guiding element 4 connects adjacent to this element 3, at only a slight vertical distance a. This air catching and guiding element 4 is dome-shaped and has a rear wall surface 8 which extends as an extension of surface 7 of the deflecting element 4. This rear wall surface 8 is bordered by two walls 9 and 10 which extend into one another and are placed out against the driving direction F. The walls 9 and 10 are preferably curved within themselves so that the arriving air current 5 or 5a, in a targeted manner and without any significant losses, can be deflected and guided to the opening 12.

The wall 10, which is opposite the opening 12, forms a lateral border extending approximately in longitudinal direction of the vehicle, the other wall 9 forming an upper end of element 4. Both walls 9 and 10 extend into one another without any offsetting, or they consist of one part.

In its cross-section according to Line II—II in FIG. 1, the wall 9 is recessed approximately in the shape of a semicircle and forms a channel 13, which extends toward the opening 12, the edge 14 of this channel 13, which forms the air outlet area, corresponds in part approximately to the course of the circumferential edge 15 of the opening 12.

In its cross-section as well as in its longitudinal section (FIG. 3), the deflecting element 3 has a slight arching, one of its end areas 16 corresponding approximately to the rounded inlet area of the wall 10 of the air catching and guiding element 4.

When the vehicle is driven, the air current, possibly by means of a front-end spoiler, is sucked upward into the vehicle, is caught there by the deflecting element 3 and, in a targeted manner, is guided upward to the air catching and guiding element 4. This dome-shaped element 4 will then guide the air current 5a, without any significant losses, directly to the opening 12, behind which the brake disk 11 is arranged, and causes a cooling of this brake disk.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An air guiding arrangement for a wheel brake of a motor vehicle, having a profiled air deflecting element which is positioned against an arriving air current, wherein the arrangement comprises the profiled air deflecting element, held by and extending in a transverse direction of the vehicle and arranged below and spaced from an adjacent and separate air catching and guiding element which is circumferentially open in a forward driving direction of a vehicle and has an air inlet area (E), facing the deflecting element and an air outlet area (A) located opposite an opening in a brake protection plate of the wheel brake.

2. An arrangement according to claim 1, wherein the air catching and guiding element has a dome-shaped construction and a rear wall surface, which extends as an extension of the surface of the deflecting element, this rear wall surface, being bordered at two adjacent sides by arched walls, which are placed out against the driving direction (F).

3. An arrangement according to claim 1, wherein the air catching and guiding element includes an arched wall which forms a lateral border extending approximately in longitudinal direction of the vehicle, this arched wall being located approximately opposite the opening of the brake protection plate and entering into an other arched wall forming an upper end of the air catching and guiding element.

4. An arrangement according to claim 3, wherein the other arched wall, has the shape approximately of a semicircle in its cross-section and represents a channel which is aligned in transverse direction of the vehicle.

5. An arrangement according to claim 4, wherein the arched wall of the catching and guiding element has an edge, which has a course in the air outlet area (A) which corresponds approximately to the edge of the opening in the brake protection plate.

6. An arrangement according to claim 5, wherein the air deflecting element is arched in its cross-section and longitudinal section, and one end area of the air deflecting element corresponds approximately to a rounded inlet area into the lateral wall of the air catching and guiding element.

7. An arrangement according to claims 3, wherein the arched wall of the catching and guiding element has an edge, which has a course in the air outlet area (A) which corresponds approximately to the edge of the opening in the brake protection plate.

8. An arrangement according to claim 7, wherein the air deflecting element is arched in its cross-section and longitudinal section, and one end area of the air deflecting element corresponds approximately to a rounded inlet area into the lateral wall of the air catching and guiding element.

9. An arrangement according to claim 3, wherein the air deflecting element is arched in its cross-section and longitudinal section, and one end area of the air deflecting element corresponds approximately to a rounded inlet area into the lateral wall of the air catching and guiding element.

10. An arrangement according to claim 1, wherein the air deflecting element is arched in its cross-section and longitudinal section, and one end area of the air deflecting element corresponds approximately to a rounded inlet area into the lateral wall of the air catching and guiding element.

* * * * *